(12) United States Patent
Sims

(10) Patent No.: US 7,080,182 B2
(45) Date of Patent: Jul. 18, 2006

(54) AUTOMATIC TABLET SCRATCH PAD

(75) Inventor: R. Scott Sims, Lake Forest, CA (US)

(73) Assignee: Gateway Inc., Irvine, CA (US)

( * ) Notice: Subject to any disclaimer, the term of this patent is extended or adjusted under 35 U.S.C. 154(b) by 499 days.

(21) Appl. No.: 10/151,389

(22) Filed: May 20, 2002

(65) Prior Publication Data

US 2003/0224779 A1    Dec. 4, 2003

(51) Int. Cl.
*G06F 13/00* (2006.01)

(52) U.S. Cl. .................... 710/303; 710/304

(58) Field of Classification Search ........ 710/300–304; 455/556, 556.2, 557–561; 345/700, 173; 713/1, 2, 100; 709/222, 227
See application file for complete search history.

(56) References Cited

U.S. PATENT DOCUMENTS

| | | | |
|---|---|---|---|
| 5,625,783 A * | 4/1997 | Ezekiel et al. .............. 719/320 |
| 5,926,524 A | 7/1999 | Taylor | |
| D413,582 S | 9/1999 | Tompkins | |
| 5,995,085 A | 11/1999 | Bowen | |
| 6,029,063 A | 2/2000 | Parvulescu et al. | |
| 6,032,053 A | 2/2000 | Schroeder et al. | |
| 6,054,990 A | 4/2000 | Tran | |
| 6,167,376 A | 12/2000 | Ditzik | |
| 6,215,475 B1 | 4/2001 | Meyerson et al. | |
| 6,219,681 B1 | 4/2001 | Hawkins | |
| 6,252,948 B1 | 6/2001 | Okamoto | |
| 6,259,597 B1 | 7/2001 | Anzai et al. | |
| 6,266,539 B1 * | 7/2001 | Pardo ..................... 455/556.2 |
| 6,433,801 B1 * | 8/2002 | Moon et al. ................ 715/840 |
| 6,647,103 B1 * | 11/2003 | Pinard et al. .......... 379/110.01 |
| 6,790,178 B1 * | 9/2004 | Mault et al. ................ 600/300 |

* cited by examiner

*Primary Examiner*—Tim Vo
(74) *Attorney, Agent, or Firm*—Jeffrey A. Proehl; Woods Fuller Shultz & Smith

(57) ABSTRACT

A method, apparatus, and signal-bearing medium for determining that a tablet electronic device is docked to a docking station. Upon detection, a scratchpad application is started. When a telephone call occurs, a telephone message pad application is started. In this way, an application is automatically selected for the tablet electronic device.

20 Claims, 4 Drawing Sheets

AUTOMATIC TABLET SCRATCH PAD

FIELD

This invention relates generally to electronic devices and more particularly to a tablet computer.

BACKGROUND

A tablet computer is a type of electronic device that includes a touchscreen that accepts input via an instrument, such as a stylus or a finger, and allows the user to use the instrument and the touchscreen much as the user would use a pen and paper. Some tablet computers perform handwriting recognition using the trace of the instrument on the touchscreen, and some tablet computers merely store the traces made by the instrument without performing handwriting recognition. Thus, a tablet computer may provide the user with the ability to take notes or draw pictures using a pen-like instrument without needing to type on a keyboard.

Some tablet computers are capable of being docked, or connected, to another electronic device. For example, a tablet computer might be connected to a docking station, which might connect the tablet computer to a video monitor, keyboard, modem, or any other kind of electronic device. When the tablet computer is docked, the user must manually select the type of application the user wishes to run on the tablet computer, which takes time and effort on the user's part. Thus, there is a need for a technique for automatically selecting the application.

SUMMARY

The invention provides a method, apparatus, and signal-bearing medium for determining that a tablet electronic device is docked to a docking station. Upon detection, a scratchpad application is started. When a telephone call occurs, a telephone message pad application is started. In this way, an application is automatically selected for the tablet electronic device.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
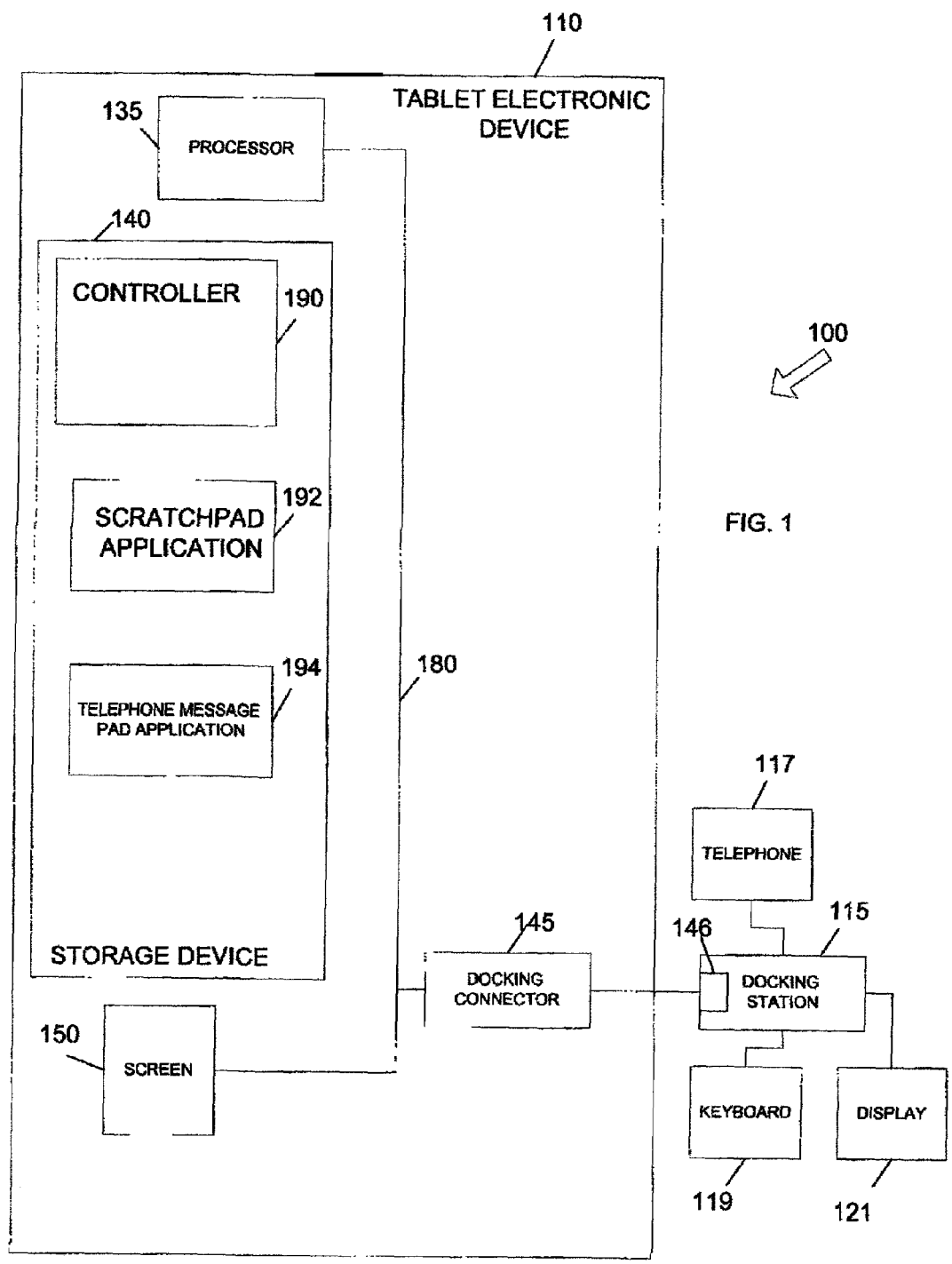
FIG. 1 depicts a block diagram of a system for implementing an embodiment of the invention.

FIG. 1 depicts a block diagram of a system for implementing an embodiment of the invention.

A system 100 may include a tablet electronic device 110 capable of being connected to a docking station 115, which may be connected to a telephone 117, a keyboard 119, and a display 121.

The tablet electronic device 110 may include a processor 135, a storage device 140, a docking connector 145, and a screen 150, all connected via a bus 180. The processor 135 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 135 may execute instructions and may include that portion of the tablet electronic device 110 that controls the operation of the entire electronic device. Although not depicted in FIG. 1, the processor 135 typically includes a control unit that organizes data and program storage in memory and transfers data and other information between the various parts of the tablet electronic device 110. The processor 135 may receive input data from the screen 150, may read and store code and data in the storage device 140, and may present data via the screen 150.

Although the tablet electronic device 110 is shown to contain only a single processor 135 and a single bus 180, the present invention applies equally to electronic devices that may have multiple processors and to electronic devices that may have multiple buses with some or all performing different functions in different ways.

The storage device 140 represents one or more mechanisms for storing data. For example, the storage device 140 may include read only memory (ROM), random access memory (RAM), magnetic disk storage media, optical storage media, flash memory devices, and/or other machine-readable media. In other embodiments, any appropriate type of storage device may be used. Although only one storage device 140 is shown, multiple storage devices and multiple types of storage devices may be present. Further, although the tablet electronic device 110 is drawn to contain the storage device 140, it may be distributed across other electronic devices.

The storage device 140 may include a controller 190, a scratchpad application 192, and a telephone message pad application 194. The controller 190 may include instructions capable of being executed on the processor 135 to carry out the functions of the present invention, as further described below with reference to FIG. 3. In another embodiment, some or all of the functions of the present invention may be carried out via hardware in lieu of a processor-based electronic device. Of course, the storage device 140 may also contain additional software and data (not shown), which is not necessary to understanding the invention.

The scratchpad application 192 enables to the user input data via screen 150 using an instrument. The scratchpad application 192 detects traces that the instrument makes on the screen 150. In an embodiment, the scratchpad application 192 saves notes taken via the screen 150. In another embodiment, the scratchpad application 192 uses character recognition to recognizes characters formed from the traces using PEN-OS or PenDOS. In another embodiment, the scratchpad application 192 recognizes characters using any appropriate technology. In another embodiment, the scratchpad application 192 saves images from the traces without performing character recognition.

In an embodiment, the telephone message pad application 194 may present a user interface on the screen 150 that allows a user to enter data tailored to taking telephone messages. The telephone message pad application 194 is further described below with reference to FIG. 4.

The docking connector 145 facilitates communication between the tablet electronic device 110 and the docking station 115. The docking connector 145 provides the tablet electronic device 110 with a means of electronically communicating information with remote electronic devices, such as the telephone 117, the keyboard 119, and the display 121 via the docking station 115. Although only one docking connector 145 is shown, in other embodiments multiple docking connectors of the same or of a variety of types may be present.

The screen 150 is that part of the tablet electronic device 110 that accepts input from a user and displays output to the user. In an embodiment, the screen 150 may be a touch screen or touchpad capable of being utilized with an instrument, which may be a pen, pencil, stylus, finger, other appendage, or any instrument suitable for operation with the screen 150. In an embodiment, the screen 150 may include a transparent touch sensitive overlay that forms a digitizer capable of tracking movement of the instrument across the screen 150. As the user moves the instrument across the screen 150, the tablet electronic device 110 may track movement of the instrument and may display the tracked movement on the screen 150, so to the user can see the trace of the instrument in what appears to be real time. Thus, the user may write characters and sentences on the screen 150 and may draw sketches, or a combination of both. Although only one screen 150 is shown, in other embodiments any number of screens of the same or of a variety of types may be present.

The bus 180 may represent one or more busses (e.g., PCI, ISA (Industry Standard Architecture), X-Bus, EISA (Extended Industry Standard Architecture), or any other appropriate bus and/or bridge (also called a bus controller).

The tablet electronic device 110 may be implemented using any suitable hardware and/or software, such as a personal computer or other electronic computing device. Portable computers, laptop or notebook computers, PDAs (Personal Digital Assistants), two-way alphanumeric pagers, portable telephones, pocket computers, and mainframe computers are examples of other possible configurations of the tablet electronic device 110. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Thus, an embodiment of the invention may apply to any hardware configuration that supports docking to a docking station.

The docking station 115 connects the tablet electronic device 110 to devices that typically are not included within the table electronic device 110. The docking station 115 may include docking connector 146 for connecting to docking connector 145. In another embodiment, the docking station 115 may be a port replicator. Users typically leave docking stations in one place while they travel with their portable electronic device. Then, when they return to the docking station, they connect to the docking station in order to use devices not included within the tablet electronic device. Although the docking station 115 is shown connected to the telephone 117, the keyboard 119, and the display 121, in another embodiment the docking station 115 may connect to any appropriate device, such as a CD-ROM, a printer, a network, or a mouse, or any other appropriate device.

The telephone 117 may be any form of telephone, including hard-wired and wireless telephones. The telephone 117 may be utilized by a user of the tablet electronic device 110. In another embodiment, the telephone 117 may not be present. In another embodiment the telephone 117 may be a modem or may be part of a modem. In another embodiment, the telephone 117 may be connected directly to the tablet electronic device 110.

The display 121 may be a cathode-ray tube (CRT) based video display well known in the art of computer hardware. But, in other embodiments the display 121 may be replaced with a liquid crystal display (LCD) based or gas, plasma-based, flat-panel display. In still other embodiments, any appropriate display device may be used. In yet other embodiments, a speaker that produces audio output may be used. In an embodiment, the display 121 may display the same images from the same application as those displayed on the screen 150. In another embodiment, the display 121 may display data or images from a different application As will be described in detail below, aspects of an embodiment pertain to specific apparatus and method elements implementable on a tablet electronic device. In another embodiment, the invention may be implemented as a program product for use with a tablet electronic device. The programs defining the functions of this embodiment may be delivered to a tablet electronic device via a variety of signal-bearing media, which include, but are not limited to:

(1) information permanently stored on a non-rewriteable storage medium (e.g., read-only memory devices attached to or within a tablet electronic device, such as a CD-ROM readable by a CD-ROM drive);

(2) alterable information stored on a rewriteable storage medium (e.g., a hard disk drive or diskette); or (3) information conveyed to a tablet electronic device by a communications medium, such as through a computer or the telephone network accessed via a network, including wireless communications.

Such signal-bearing media, when carrying machine-readable instructions that direct the functions of the present invention, represent embodiments of the present invention.

Figure 2:
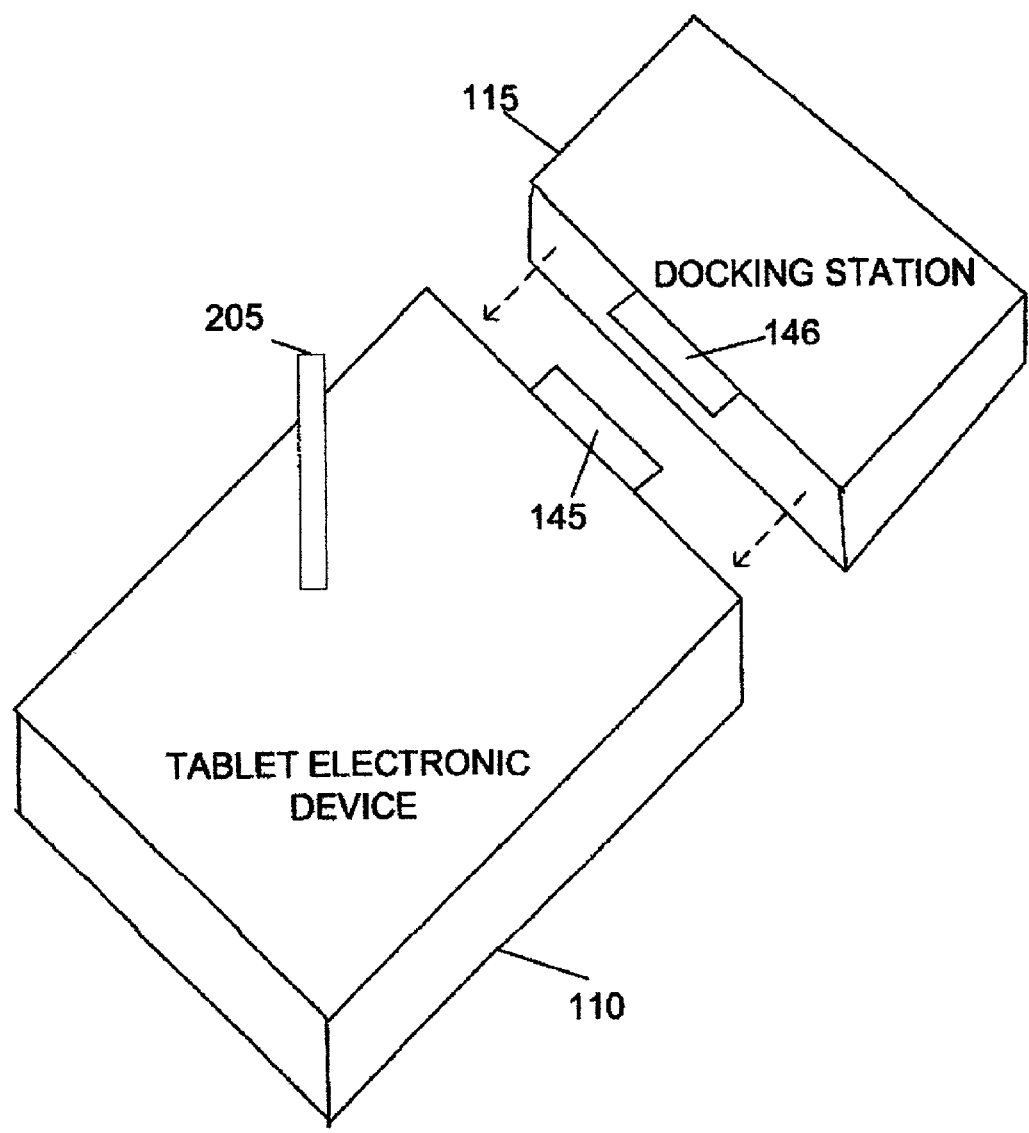
FIG. 2 depicts a perspective view of a system for implementing an embodiment of the invention.

FIG. 2 depicts a perspective view of a system for implementing an embodiment of the invention. The tablet electronic device 110 is shown capable of being connected to the docking station 115 via the docking connectors 145 and 146. The user may trace using the instrument 205, which may be a pen, pencil, stylus, finger, other appendage, or any suitable instrument.

Figure 3:
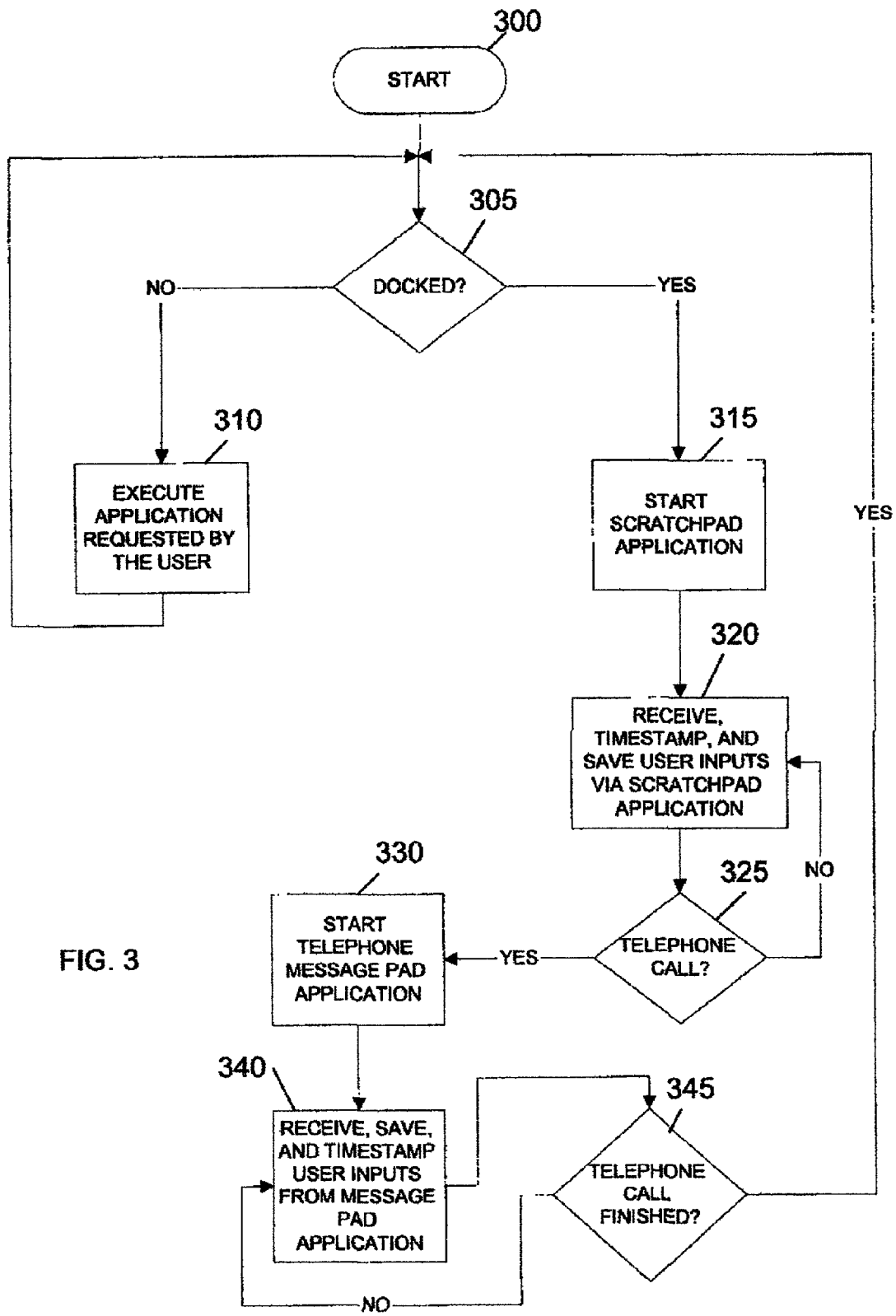
FIG. 3 depicts a flowchart of processing, according to an embodiment of the invention.

FIG. 3 depicts a flowchart of processing, according to an embodiment of the invention. Control begins at block 300. Control then continues to block 305 where the controller 190 determines whether the tablet electronic device 110 is docked to the docking station 115 via the docking connectors 145 and 146. If the determination at block 305 is true, then control continues to block 315 where the controller 190 starts the scratchpad application 192. In an embodiment, the controller 190 starts the scratchpad application 192 executing on the processor 135. Control then continues to block 320 where the controller 190 receives user input via screen 150 and instrument 205, timestamps the user input, and saves the user input in the storage device 140.

Control then continues to block 325 where the controller 190 determines whether a telephone call has been received at the telephone 117. If the determination at block 325 is true, then control continues to block 330 where the controller 190 starts the telephone message pad application 194. In an embodiment, the controller 190 starts the telephone message pad application 194 executing on the processor 135. The telephone message pad application 194 displays a user interface as further described below with reference to FIG. 4. Control then continues to block 340 where the controller 190 receives user input via screen 150 and instrument 205, timestamps the user input, and saves the user input in storage device 140. Control then continues to block 345 where the controller 190 determines whether the telephone call is finished.

If the determination at block 345 is true, then control returns to block 305, as previously described above.

If the determination at block 345 is false, then control returns to block 340, as previously described above.

If the determination at block 325 is false, then control returns to block 320, as previously described above.

If the determination at block 305 is false, then control continues to block 310 where the controller 190 starts the application requested by the user. In an embodiment, the controller 190 starts the application executing on the processor 135. Control then returns to block 305 as previously described above.

Figure 4:
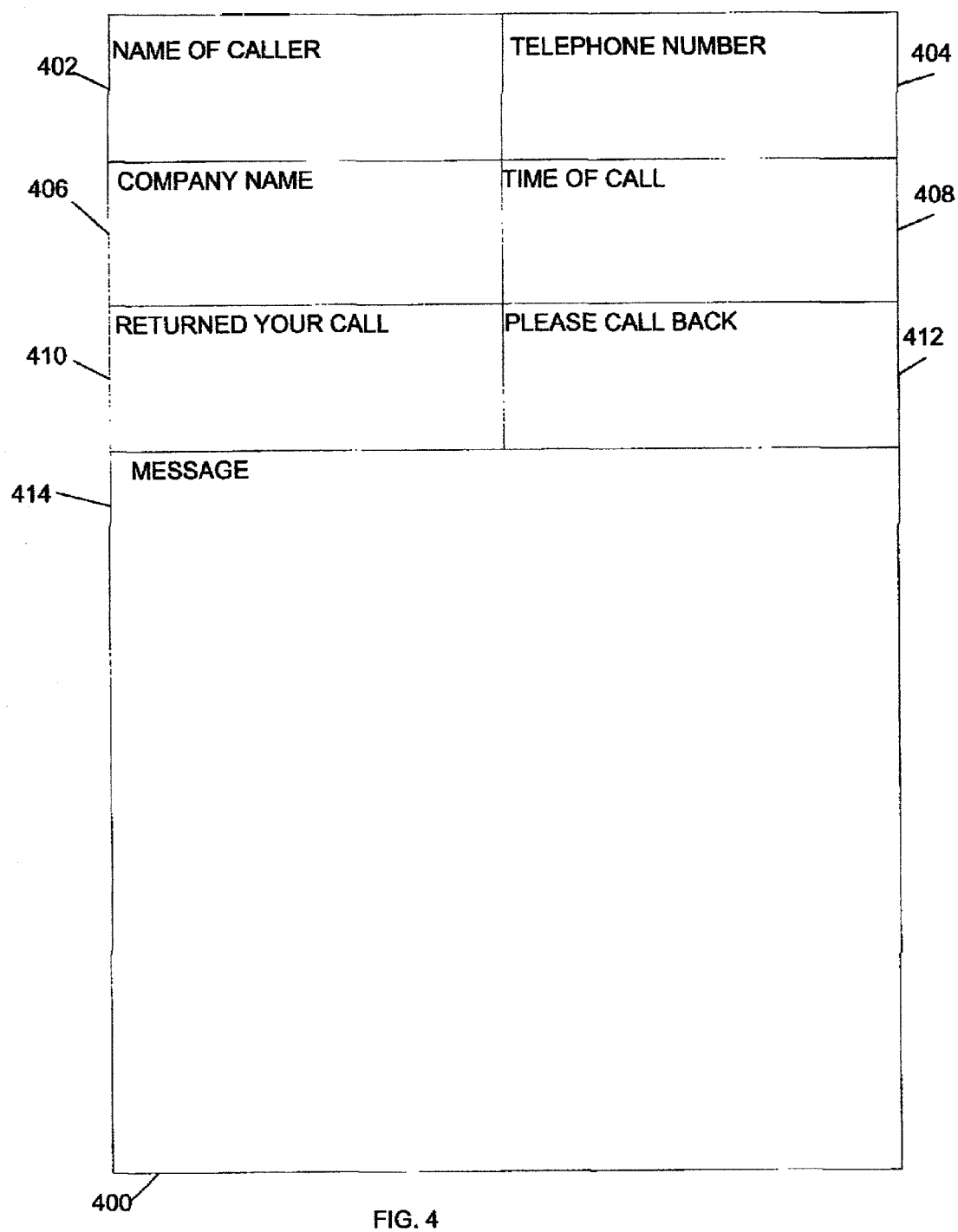
FIG. 4 depicts a block diagram of a user interface for a telephone message pad application.

FIG. 4 depicts a block diagram of a user interface 400 displayed on the screen 150 for a telephone message pad application 194. In an embodiment, the telephone message pad application 194 may present a user interface 400 on the screen 150 that allows a user to enter data tailored to taking telephone messages. In an embodiment, the user interface 400 may include a name of the caller field 402, a telephone number field 404, a company name field 406, a time of call field 408, a returned your call field 410, a please call back field 412, and a message field 414. The telephone message pad application 194 may provide the user the ability to enter data in to the fields of user interface 400 using instrument 205 and may save the entered data in storage device 140 for later retrieval.

Thus, a method, apparatus, and signal-bearing medium are provided for determining that a tablet electronic device is docked to a docking station. Upon detection, a scratchpad application is started. When a telephone call occurs, a telephone message pad application is started. In this way, an application is automatically selected for the tablet electronic device.

What is claimed is:

1. A machine-implemented method, comprising:
   determining when an electronic device is being docked to a docking station; and
   when the electronic device is being docked to the docking station, starting a scratchpad application that enables input of data through contact with a screen of the electronic device.

2. The method of claim 1, further comprising:
   determining whether a call on a telephone in progress; and
   when the telephone call is in progress, starting a telephone message pad application executing on the electronic device;
   wherein the telephone message pad application enables input of data through contact with the screen of said electronic device.

3. The method of claim 1, wherein a telephone is connected to the docking station.

4. The method of claim 1, wherein the telephone is connected to the electronic device.

5. The method of claim 1, wherein the scratchpad application receives and stores user inputs.

6. An electronic device comprising:
   a screen;
   a docking connector; and
   a controller to automatically select an application to execute when the docking connector is being connected to another electronic device;
   wherein the application to be executed enables input of data through contact with the screen.

7. The electronic device of claim 6 wherein the another electronic device comprises a docking station.

8. The electronic device of claim 6, wherein the controller is to execute a scratchpad application when the docking connector is connected to the another electronic device.

9. The electronic device of claim 8, further comprising:
   a screen, wherein the scratchpad application is to perform handwriting recognition of a trace on the screen.

10. The electronic device of claim 8, further comprising:
    a screen, wherein the scratchpad application is to receive, timestamp, and store user inputs from a trace on the screen.

11. The electronic device of claim 10, wherein the trace is formed on the screen using an instrument.

12. A storage medium readable by an information handling system and comprising instructions, wherein the instructions when read and executed by the information handling system comprise:
    determining when an electronic device is being connected to a docking station; and
    when the electronic device is being connected to the docking station, starting a telephone message pad application when a telephone call is received by a telephone connected to the docking station;
    wherein the telephone message pad application enables input of data through contact with a screen of the electronic device.

13. The storage medium of claim 12, wherein the telephone message pad application displays a user interface on the screen.

14. The storage medium of claim 13, wherein the user interface includes input fields, comprising: a name of caller field, a telephone number field, and a time of call field.

15. The storage medium of claim 14, further comprising:
    detecting instrument traces on the screen in the input fields; and
    performing character recognition on the traces.

16. A system comprising:
    a docking station including a first docking connector; and
    a tablet computer, including:
    a screen;
    a second docking connector, and
    a controller configured to start a scratchpad application when the second docking connector is being connected to the first docking connector;
    wherein the scratchpad application enables input of data through contact with the screen of the tablet computer.

17. The system of claim 16, wherein the tablet computer further includes a telephone message pad application and wherein the controller is configured to start the telephone message pad application when a call on a telephone is in progress.

18. The system of claim 17, wherein the telephone message pad application receives, saves, and timestamps inputs from a trace formed on the screen by an instrument.

19. The system of claim 18, wherein the instrument comprises a stylus.

20. The method of claim 1, wherein the scratchpad application is configured to perform handwriting recognition of a trace on a screen of the electronic device.

* * * * *